US011210775B1

(12) United States Patent
Wu et al.

(10) Patent No.: US 11,210,775 B1
(45) Date of Patent: Dec. 28, 2021

(54) GRADIENT-EMBEDDED VIDEO ANOMALY DETECTION

(71) Applicant: International Business Machines Corporation, Armonk, NY (US)

(72) Inventors: Bo Wu, Cambridge, MA (US); Chuang Gan, Cambridge, MA (US); Dakuo Wang, Cambridge, MA (US); Rameswar Panda, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/025,639

(22) Filed: Sep. 18, 2020

(51) Int. Cl.
*G06K 9/00* (2006.01)
*G06T 7/00* (2017.01)
*G06T 7/269* (2017.01)
*G06N 3/08* (2006.01)

(52) U.S. Cl.
CPC ............ *G06T 7/0002* (2013.01); *G06N 3/08* (2013.01); *G06T 7/269* (2017.01); *G06T 2207/10016* (2013.01); *G06T 2207/20081* (2013.01); *G06T 2207/20084* (2013.01)

(58) Field of Classification Search
CPC ................... G06T 7/0002; G06T 7/269; G06T 2207/10016; G06T 2207/20081; G06T 2207/20084; G06N 3/08
USPC ....................................................... 382/107
See application file for complete search history.

(56) References Cited

U.S. PATENT DOCUMENTS

| 8,744,124 B2 | 6/2014 | Venkatesh et al. |
| 9,189,688 B2 | 11/2015 | Desimone et al. |
| 10,242,282 B2 * | 3/2019 | Loce ..................... G06K 9/6277 |
| 10,409,859 B2 | 9/2019 | Gupta et al. |
| 10,762,662 B2 * | 9/2020 | Chalamala ........... G06K 9/6232 |
| 2010/0208063 A1 | 8/2010 | Lee et al. |
| 2015/0161453 A1 | 6/2015 | Desimone et al. |

(Continued)

FOREIGN PATENT DOCUMENTS

WO     2020154373 A1     7/2020

OTHER PUBLICATIONS

Yu, Guang, et al. "Cloze test helps: Effective video anomaly detection via learning to complete video events." Proceedings of the 28th ACM International Conference on Multimedia. 2020. (Year: 2020).*

(Continued)

*Primary Examiner* — Jonathan S Lee
(74) *Attorney, Agent, or Firm* — Scully, Scott, Murphy & Presser, P.C.; Daniel P. Morris

(57) ABSTRACT

A sequence of frames of a video can be received. For a given frame in the sequence of frames, a gradient-embedded frame is generated corresponding to the given frame. The gradient-embedded frame incorporates motion information. The motion information can be represented as disturbance in the gradient-embedded frame. A plurality of such gradient-embedded frames can be generated corresponding to a plurality of the sequence of frames. Based on the plurality of gradient-embedded frames, a neural network such as a generative adversarial network is trained to learn to suppress the disturbance in the gradient-embedded frame and to generate a substitute frame. In inference stage, anomaly in a target video frame can be detected by comparing it to a corresponding substitute frame generated by the neural network.

20 Claims, 13 Drawing Sheets

(56) References Cited

U.S. PATENT DOCUMENTS

| | | |
|---|---|---|
| 2018/0314835 A1 | 11/2018 | Dodson et al. |
| 2018/0329928 A1 | 11/2018 | Gupta et al. |
| 2019/0188864 A1 | 6/2019 | Madsen |
| 2019/0294869 A1 | 9/2019 | Naphade et al. |
| 2019/0354688 A1 | 11/2019 | Ding et al. |
| 2020/0125923 A1 | 4/2020 | Jones |

OTHER PUBLICATIONS

Jamadandi, Adarsh, Sunidhi Kotturshettar, and Uma Mudenagudi. "PredGAN: a deep multi-scale video prediction framework for detecting anomalies in videos." Proceedings of the 11th Indian Conference on Computer Vision, Graphics and Image Processing. 2018. (Year: 2018).*

Lai, Yuandu, Rui Liu, and Yahong Han. "Video anomaly detection via predictive autoencoder with gradient-based attention." 2020 IEEE International Conference on Multimedia and Expo (ICME). IEEE, 2020. (Year: 2020).*

Li, Nanjun, Faliang Chang, and Chunsheng Liu. "Spatial-temporal cascade autoencoder for video anomaly detection in crowded scenes." IEEE Transactions on Multimedia 23 (2020): 203-215. (Year: 2020).*

Kumaran, Santhosh Kelathodi, et al. "Video trajectory classification and anomaly detection using hybrid CNN-VAE." arXiv preprint arXiv:1812.07203 (2018). (Year: 2018).*

Li, Nanjun, and Faliang Chang. "Video anomaly detection and localization via multivariate gaussian fully convolution adversarial autoencoder." Neurocomputing 369 (2019): 92-105. (Year: 2019).*

Khan, S., et al. "Spatio-Temporal Adversarial Learning for Detecting Unseen Falls", arXiv:1905.07817v2, Mar. 2, 2020, 17 pages.

Bian, J., et al., "A Novel and Efficient CVAE-GAN-Based Approach With Informative Manifold for Semi-Supervised Anomaly", Digital Object Identifier, accepted May 12, 2019, Published Jun. 3, 2019, current version Jul. 22, 2019, pp. 88903-88916, vol. 7.

Tang, W., et al., "Anomaly residual prediction with spatial-temporal and perceptual constraints", Journal of Electronic Imaging, Nov./Dec. 2019, pp. 063004-1-063004-11, vol. 28(6).

Akcay, S., et al., "Skip-GANomaly: Skip Connected and Adversarially Trained Encoder-Decoder Anomaly Detection", Jan. 25, 2019, arXiv:1901.08954v1, 8 pages.

Goodfellow, I.J., et al., "Generative Adversarial Nets", arXiv: 1406.2661v1, Jun. 10, 2014, 9 pages.

Hasan, M., et al., "Learning Temporal Regularity in Video Sequences", 2016 IEEE Conference on Computer Vision and Pattern Recognition (CVPR), Jun. 27-20, 2016, pp. 733-742.

Ilg, E., et al., "FlowNet 2.0: Evolution of Optical Flow Estimation with Deep Networks", 2017 IEEE Conference on Computer Vision and Pattern Recognition (CVPR), Jul. 21-26, 2017, pp. 2462-2470.

Liu, W., et al., "Future Frame Prediction for Anomaly Detection—A New Baseline", 2018 IEEE/CVF Conference on Computer Vision and Pattern Recognition, Jun. 18-23, 2018, pp. 6536-6545.

Nguyen, T.-N., et al., "Anomaly Detection in Video Sequence with Appearance-Motion Correspondence", 2019 IEEE/CVF International Conference on Computer Vision (ICCV), Oct. 27-Nov. 2, 2019, pp. 1273-1283.

Radford, A., et al., "Unsupervised Representation Learning with Deep Convolutional Generative Adversarial Networks", arXiv:1511. 06434v2, Jan. 7, 2016, 16 pages.

Ronneberger, O., et al., "U-Net: Convolutional Networks for Biomedical Image Segmentation", arXiv: 1505.04597v1, May 18, 2015, 8 pages.

Szegedy, C., et al., "Going Deeper with Convolutions", 2015 IEEE Conference on Computer Vision and Pattern Recognition (CVPR), Jun. 7-12, 2015, 9 pages.

Szegedy, C., et al., "Rethinking the inception architecture for computer vision", 2016 IEEE Conference on Computer Vision and Pattern Recognition (CVPR), Jun. 27-30, 2016, pp. 2818-2826.

Shean, Y., et al., "Abnormal event detection in videos using spatiotemporal autoencoder", arXiv:1701.01546v1, Jan. 9, 2017, 20 pages.

Luo, "Remembering history with convolutional lstm for anomaly detection", 2017 IEEE International Conference on Multimedia and Expo (ICIME), Jul. 10-14, 2017, pp. 439-444.

Narasimhan, M., et al., "Dynamic video anomaly detection and localization using sparse denoising autoencoders", Multimedia Tools and Applications (2018), Revised Jun. 7, 2017, Accepted Jun. 11, 2017, Published online Jun. 21, 2017, pp. 13173-13195, vol. 77.

Zhao, Y., et al., "Spatio-temporal autoencoder for video anomaly detection", MM'17, Oct. 23-27, 2017, pp. 1933-1941, Session: Novel 2.

\* cited by examiner

GRADIENT-EMBEDDED VIDEO ANOMALY DETECTION

BACKGROUND

The present application relates generally to computers and computer applications, and more particularly to computer vision, machine learning, and video anomaly detection.

Video Anomaly Detection (VAD) refers to the identification of events that do not conform to expected behavior in the video under certain scenes, for instance, unusual events in a video. VAD, in an aspect, is a problem of unsupervised video modeling and pattern recognition. For instance, given an unknown video sequence, a task is to detect whether there is an anomaly in one or more frames of the video. VAD can have applications in public safety and city management, and or others, for example, in which the surveillance cameras are used. The complex high-dimension structure of videos and the diversity of anomaly can pose a challenge in video anomaly detection.

Existing methods train models to detect anomaly frames by comparing with spatio-temporal features through the whole video sequence to model normal videos and detect anomaly as outliers. However, the detection of a normal frame within a video sequence can be disturbed by the local appearance change among neighbor video frames. This disturbance increases the false alarms and burden on abnormal feature learning. In addition, for detecting abnormal cases, which may occur in several segments or frames of a video, using information present in the entire or whole video sequence can become expensive and redundant.

BRIEF SUMMARY

Methods, systems and program products can be provided for detecting anomaly in video. A method, in one aspect, can include receiving a sequence of frames of a video. The method can also include, for a given frame in the sequence of frames, generating a gradient-embedded frame corresponding to the given frame, the gradient-embedded frame incorporating motion information. The method can also include generating a substitute frame corresponding to the given frame by running a neural network, the neural network trained to generate a substitute frame by learning to suppress disturbance in a training set of gradient-embedded frames. The method can also include comparing the substitute frame and the given frame to detect anomaly in the given frame.

In another aspect, a method can include receiving a sequence of frames of a video as a training data set. The method can also include, for a given frame in the sequence of frames, generating a gradient-embedded frame corresponding to the given frame, the gradient-embedded frame incorporating motion information, the motion information represented as disturbance in the gradient-embedded frame, wherein a plurality of gradient-embedded frames are generated corresponding to a plurality of the sequence of frames. The method can also include, based on the plurality of gradient-embedded frames, training a neural network to learn to suppress the disturbance in the gradient-embedded frame to generate a substitute frame.

A system, in one aspect, can include a processor and a memory device coupled with the processor. The processor can be configured to receive a sequence of frames of a video as a training data set. The processor can also be configured to, for a given frame in the sequence of frames, generate a gradient-embedded frame corresponding to the given frame, the gradient-embedded frame incorporating motion information among a set of neighboring frames of the given frame, the motion information represented as disturbance in the gradient-embedded frame, wherein a plurality of gradient-embedded frames are generated corresponding to a plurality of the sequence of frames. The processor can also be configured to, based on the plurality of gradient-embedded frames, train a generative adversarial network to learn to suppress the disturbance in the gradient-embedded frame to generate a substitute frame.

In another aspect, a system can include a processor and a memory device coupled with the processor. The processor can be configured to receive a sequence of frames of a video. The processor can also be configured to, for a given frame in the sequence of frames, generate a gradient-embedded frame corresponding to the given frame, the gradient-embedded frame incorporating motion information. The processor can also be configured to generate a substitute frame corresponding to the given frame by running a neural network, the neural network trained to generate a substitute frame by learning to suppress disturbance in a training set of gradient-embedded frames. The processor can also be configured to compare the substitute frame and the given frame to detect anomaly in the given frame.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
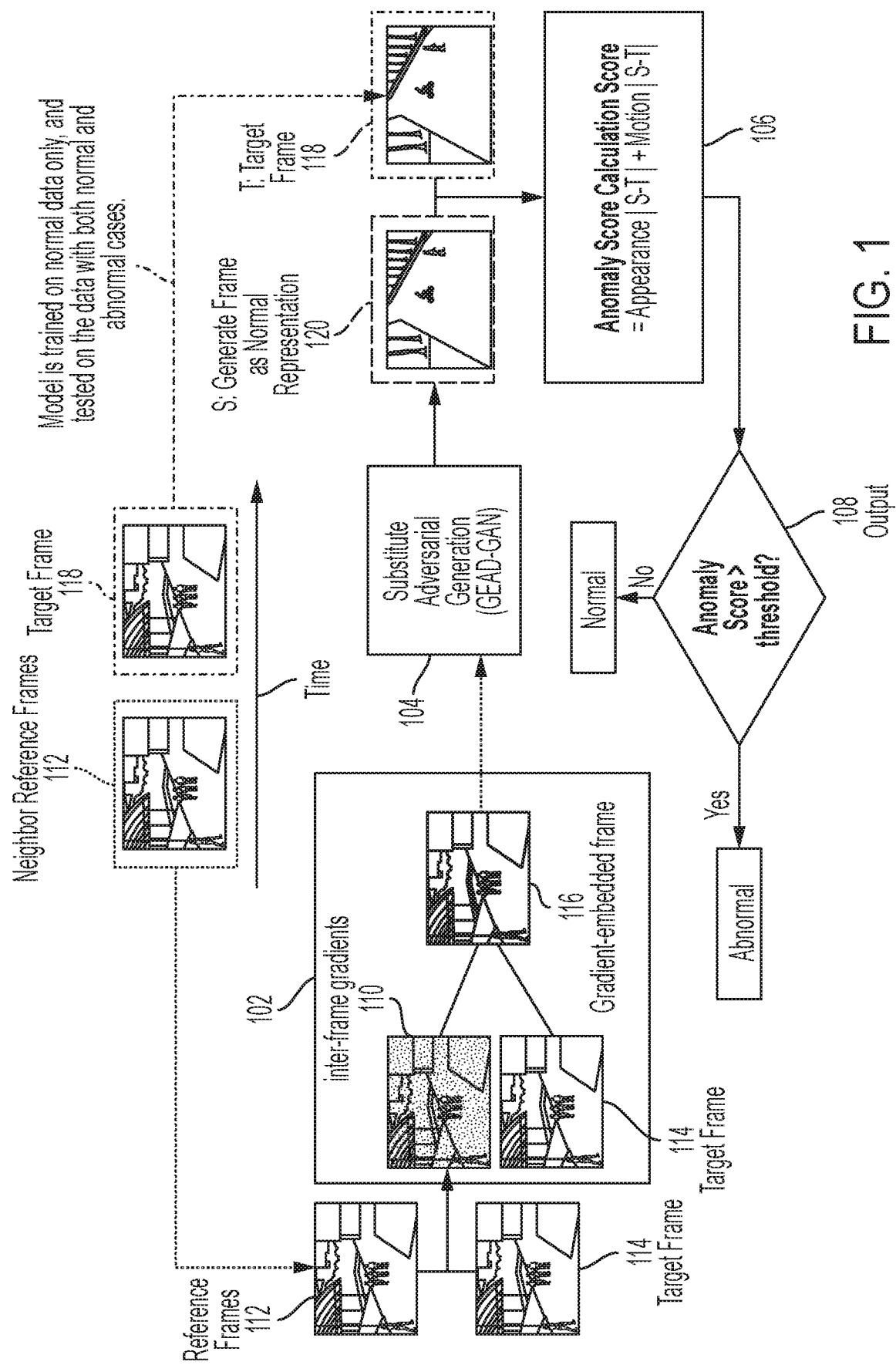
FIG. 1 is a diagram illustrating a pipeline for video anomaly detection in an embodiment.

Systems and methods can be provided for video anomaly detection (VAD). In one or more embodiments, a system and/or method can include generative and adversarial neural networks to detect abnormal frames by comparing with gradient-embedded normal frames as adversarial substitute frames.

In one or more embodiments, the system and/or method may embed in original frames, a distribution followed by the normal motion frame gradient, which can be different from those introduced by an anomaly, as a disturbance that relates to motion information to form a gradient-embedded frame. The system and/or method may generate substitute frames corresponding to original frames by suppressing the disturbance in gradient-embedded ones. During inference, anomaly in one or more video frames can be detected by a fail suppression in one or more substitute frames, which is caused by the difference between normal disturbances and abnormal ones. For instance, the non-local temporal information (object motion) among frames can be represented as the disturbance in frame gradients form and can be embedded into local spatial information (object appearance). The problem of video anomaly detection can be transformed into building a model to suppress such disturbance in normal frames, and the anomaly can be detected by the failed suppressing during inference.

In one or more embodiments, Gradient-Embedded Anti-Disturbance Generative Adversarial Networks (GEAD-GAN) can be provided for video anomaly detection by introducing motion disturbance and suppressing it through adversarial learning. In an aspect, videos containing only normal scenes can be used in the training stage. A trained model is capable of evaluating the anomaly scores for an unknown input at the frame-level.

For example, to obtain the frame contained disturbance, the system and/or method may generate gradient-embedded frames through embedding frame gradients in original frames. Frame gradients are suitable for embedding as disturbance. Then, the normal gradient-embedded frames are used to train a generative adversarial network (GAN), for example, a GEAD-GAN. In an embodiment, a goal of the GEAD-GAN is to learn to suppress the disturbance in gradient-embedded frames to generate substitute frames and make them approach original ones as much as possible. In an embodiment, to achieve this, four loss functions including Adversarial Loss, Contextual Loss, Gradient Loss, and Optical Flow Loss are introduced to compose the objective function. Given an assumption that such gradients distribution of normal motion is different from abnormal ones, and the GEAD-GAN is trained with only normal frames, during the inference stage, the disturbance coming from gradients embedding can be suppressed in normal substitute frames but fail in abnormal ones so that the anomaly can be detected. In an embodiment, for example, at the inference stage, the system and/or method may define an anomaly score to quantitatively evaluate the frame-level anomaly possibility for an unknown input.

During the network training, the GEAD-GAN learns to suppress normal gradients disturbance by translating the gradient-embedded frames to substitute frames as similar to original ones as possible. In one or more embodiments, the anomaly score for frame-level detection can be defined based on objective functions.

In one or more embodiments, the system and/or method may detect anomaly in a video by gradient-embedding-based substitute frames and an anti-disturbance model. For instance, the system and/or method may represent object motion as a disturbance in frames. In this way, the long frames sequence input can be simplified to the short ones. In an aspect, a Gradient-Embedded Anti-Disturbance Generative Adversarial Networks (GEAD-GAN) can be designed to suppress the disturbance in gradient-embedded frames and generate substitute frames. Such GAN can be trained end-to-end for video anomaly detection. In an aspect, the system and/or method may provide a historic observation value based normalization scheme for frame-level anomaly score that reduces the effect of variation among different scenes background.

The system and/or method in one or more embodiments can provide a video anomaly detection GEAD-GAN based on frame gradients and image-to-image translation networks. In an aspect, GEAD-GAN can translate gradient-embedded frames to substitute frames that are as similar to original ones as possible to achieve suppressing the disturbance.

In one or more embodiments, the system and/or method can include components such as gradient embedding, adversarial training, and inference. Gradient embedding in one or more embodiments generates gradient-embedded frames as disturbance inputs by embedding frame gradient to original frames related to the motion. Adversarial training in one or more embodiments, for example, a gradient-embedded generative adversarial learning includes a Gradient-Embedded Anti-Disturbance Generative Adversarial Networks (GEAD-GAN), which generates the substitute frames through suppressing the gradient disturbance in gradient-embedded frames via adversarial training. In one or more embodiments, the generation networks module generates adversarial substitute frames by using gradient-embedded frames as input. In one or more embodiments, the discrimination networks module learns to discriminate the substitute and original frames. In one or more embodiments, the entire GEAD-GAN is trained by minimizing multiple losses between the normal frames and the generated. For instance, the system and/or method may the GEAD-GAN and generate substitute frames under the supervision of original ones to suppressing disturbance as much as possible.

In inference, in one or more embodiments, for a given video, the anomaly can be detected by computing the anomaly score for each frame. In one or more embodiments, a computation module can be provided for determining the anomaly score. For instance, at the inference stage, the anomaly in an unknown input can be detected by failed suppression, and a scoring scheme for evaluating anomaly can be used for quantitative frame-level detection.

In one or more embodiments, a system and/or method represent motion in videos as the disturbance in frames. The system and/or method enable to detect the anomaly frames or segments in a given video by using neighbor frames as inputs, for example, rather than having to use the entire video. The system and/or method, in one or more embodiments, suppress the motion disturbance among the neighbor frames and enhance the robustness of the model. The system and/or method, in one or more embodiments, can achieve a higher performance compared with the existing VAD methods.

In one or more embodiment, given an input video sequence (or a set of images), a system and/or method performs a task of identifying the objects or movements with unusual occurred appearance under a certain scene. A detector may calculate a frame-level anomaly score for each given video segment.

An abnormal object activity refers to an unusual event that occurred in history under a certain scene such as a traffic scene or another scene. An anomaly score is a predictive outcome of the input target frame which one wishes to estimate a score by an anomaly detector. For example, a higher anomaly score can be designated to mean a higher possibility of anomaly. A target frame refers to a frame (e.g., an original frame) for which to detect the anomaly. A reference frame or frames are frames used to learn the normal representation. A substitute from is a generated pseudo frame. For instance, a substitute frame is used to represent the feature representation of normal events. The system and/or method in one or more embodiments determine the anomaly score based on the contradistinction between target frames and substitute frames. Intra-frame disturbance refers to pixel variance between neighbored frames. Using a GAN technique, a model can be built and/or trained that generates a substitute frame with the adversarial learning. In an embodiment, the generative adversarial networks can be trained by two neural networks (Generation Networks and Determination Networks) contesting with each other.

A system and/or method in one or more embodiments may detect anomaly using disturbance suppressing learning. For example, instead of using the entire sequence as reference frames, the system and/or method may only use several neighbor frames, for example, a pre-defined number of frames, or a subset of video frames, for each input target frame. In an aspect, such a methodology reduces the number of reference frames and decreases any redundancy. The system and/or method in an embodiment may represent the normal visual representations using gradients. For instance, a method in an embodiment calculates inter-frame gradients to preserve the motion information for the VAD task in a gradient embedding process. Such a gradient-embedded representation can reduce or prevent weakening of any representation of motion information when the number of input frames is reduced. For example, a model such as a machine learning model (e.g., a neural network model or a generative adversarial networks model) incorporates inter-frame gradients as disturbance to enhance reference frame representation. Different from the reconstruction step of existing methods, a model (also referred to as Gradient-Embedded Anti-Disturbance Generative Adversarial Networks (GEAD-GAN)) takes gradient-embedded frames as input and generates a substitute frame which is a pseudo frame for better normal event representation. The model, in an embodiment, can be trained by generation loss, adversarial loss, gradient embedding loss and contextual loss. In an embodiment, each target frame has its corresponding substitute frame. The entire model can be considered an end-to-end network and can be trained by generative adversarial learning. In one or more embodiments, the architecture of the model can include generative adversarial networks added with Inception Layers in the generation networks, which avoids a risk of missing high-level features. In one or more embodiments, an anomaly score of a target frame is calculated by comparing it with the corresponding substitute frame. For such a comparison, the system and/or method can include a score scheme that adopts smoothing-score sigmoid function for quantitative anomaly detection. Such a score scheme can be robust under different scenes. The VAD methodology disclosed herein can be less computational and consume less memory, thereby preserving processing power and memory space, compared to existing methodologies.

FIG. 1 is a diagram illustrating a pipeline for video anomaly detection in an embodiment. The components shown include computer-implemented components, for instance, implemented and/or run on one or more processors such as hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

Gradient embedding for reference frames and feature extraction for target frame at 102 generates inter-frame gradients 110, e.g., by absolute subtract between a target frame 114 and the neighbor frames 112 as references, and generates a gradient embedded frame 116 using the inter-frame gradients 110 and the target frame 114. The system and/or method in an embodiment introduce inter-frame gradient as a disturbance into original frames to form gradient-embedded frames. In an embodiment, the system and/or method calculate inter-frame gradients 110 by absolute subtract and introduce it to the reference frame through addition operation with a threshold.

Substitute adversarial generation at 104 generates substitute frame representation 120 by using gradient embedded frames 116 and learned by optimizing GAN loss, gradient embedding loss and contextual loss. For example, a generative adversarial network can be end-to-end trained to suppress the disturbance in gradient-embedded frames to form substitute ones through adversarial training. In an embodiment, the Gradient-Embedded Anti-Disturbance Generative Adversarial Networks (GEAD-GAN) generates substitute frames. The gradient loss is introduced corresponding to a gradient embedding operation. GEAD-GAN suppresses the disturbance in gradient-embedded frames and generates substitute frames. GEAD-GAN can include an Inception Module for avoiding risk of missing high-level features. In an embodiment, a model is trained on normal data only (e.g., 112 which may include 114), and tested on the data with normal (e.g., 112) and abnormal cases, for example, 118.

Anomaly score calculation at 106 compares the target frame with the reconstructed frame representation to calculate the anomaly score as the sum of appearance distance and motion distance. For example, the system and/or method compare the substitute frames and the target ones and offer the anomaly scores for detecting anomaly. The score scheme in an embodiment combines an appearance and motion error and adopts a smoothing-score sigmoid function for quantitatively detecting anomaly.

Abnormal decision at 108 compares the anomaly score with the threshold to determine whether or not the target frame is abnormal.

Figure 2A:
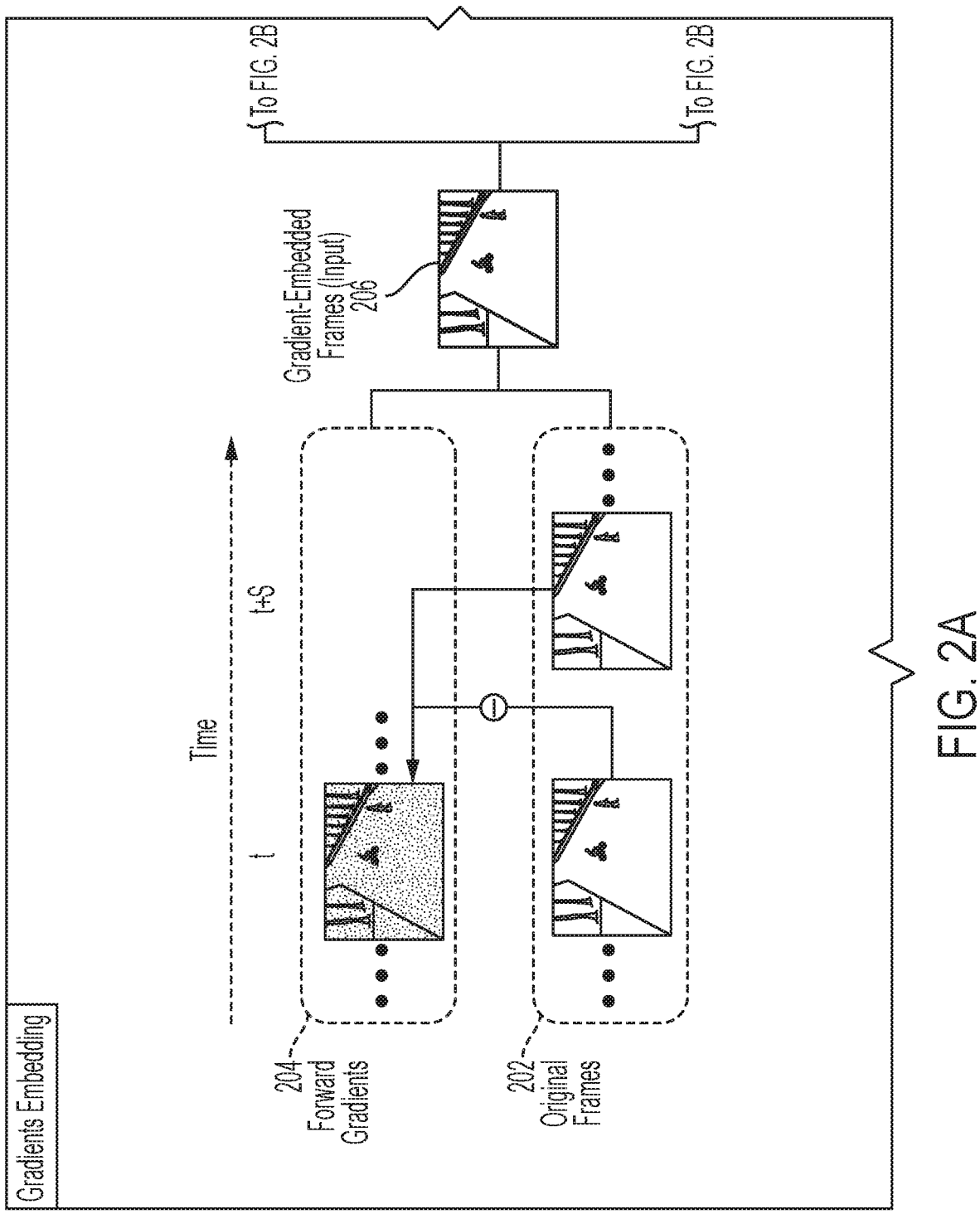
FIGS. 2A, 2B and 2C illustrate an overview of an approach in an embodiment for video anomaly detection.
Figure 2B:
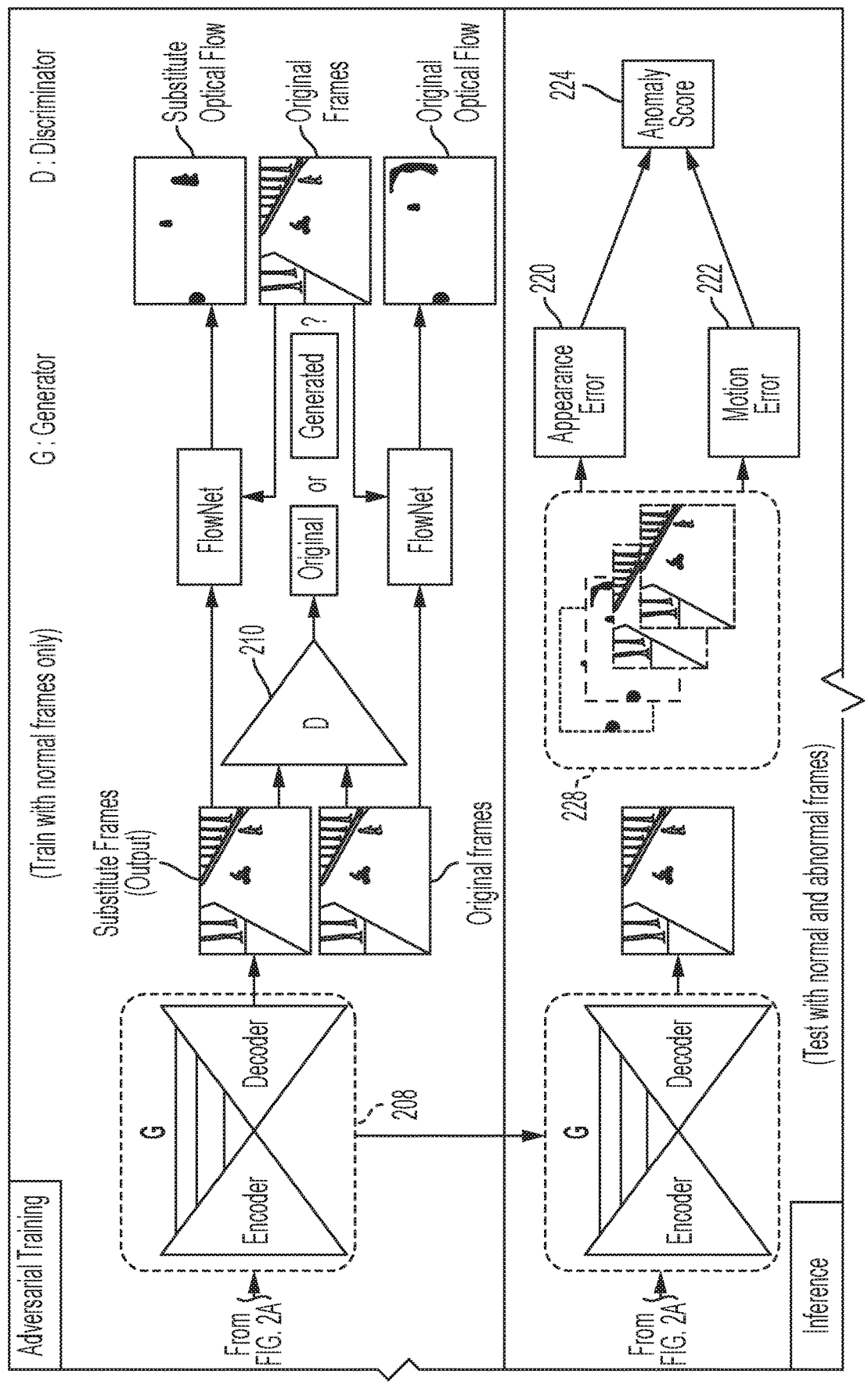
Figure 2C:
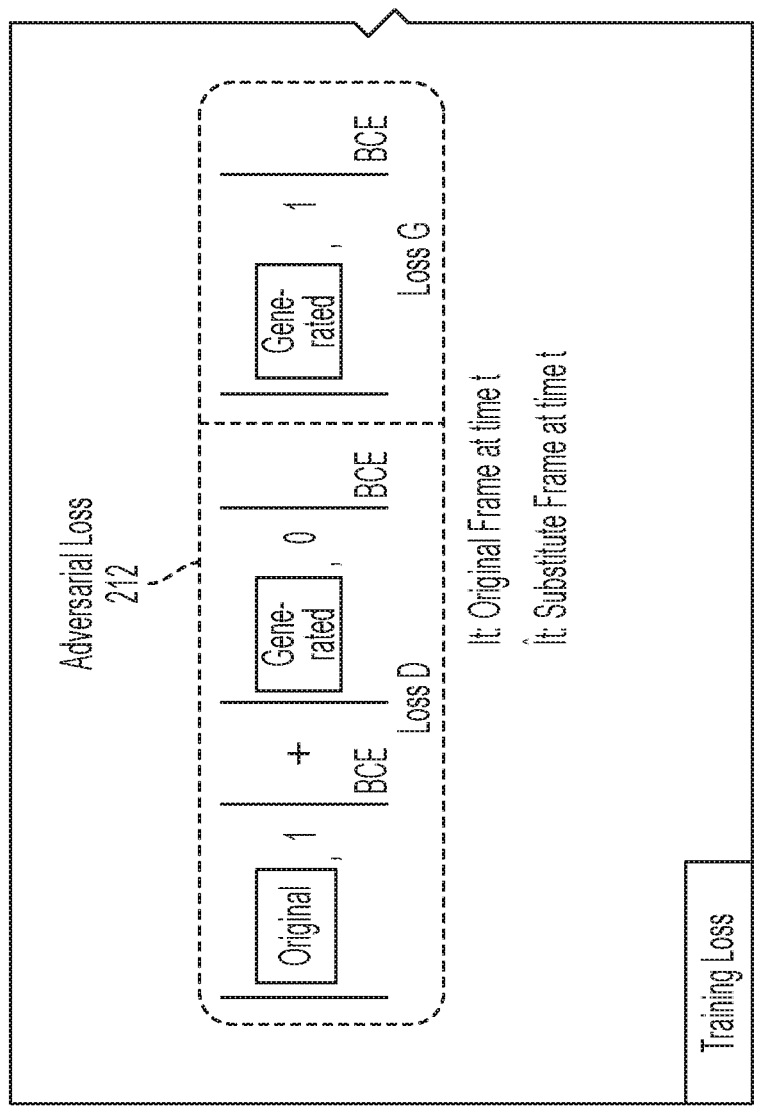
Figure 2C:
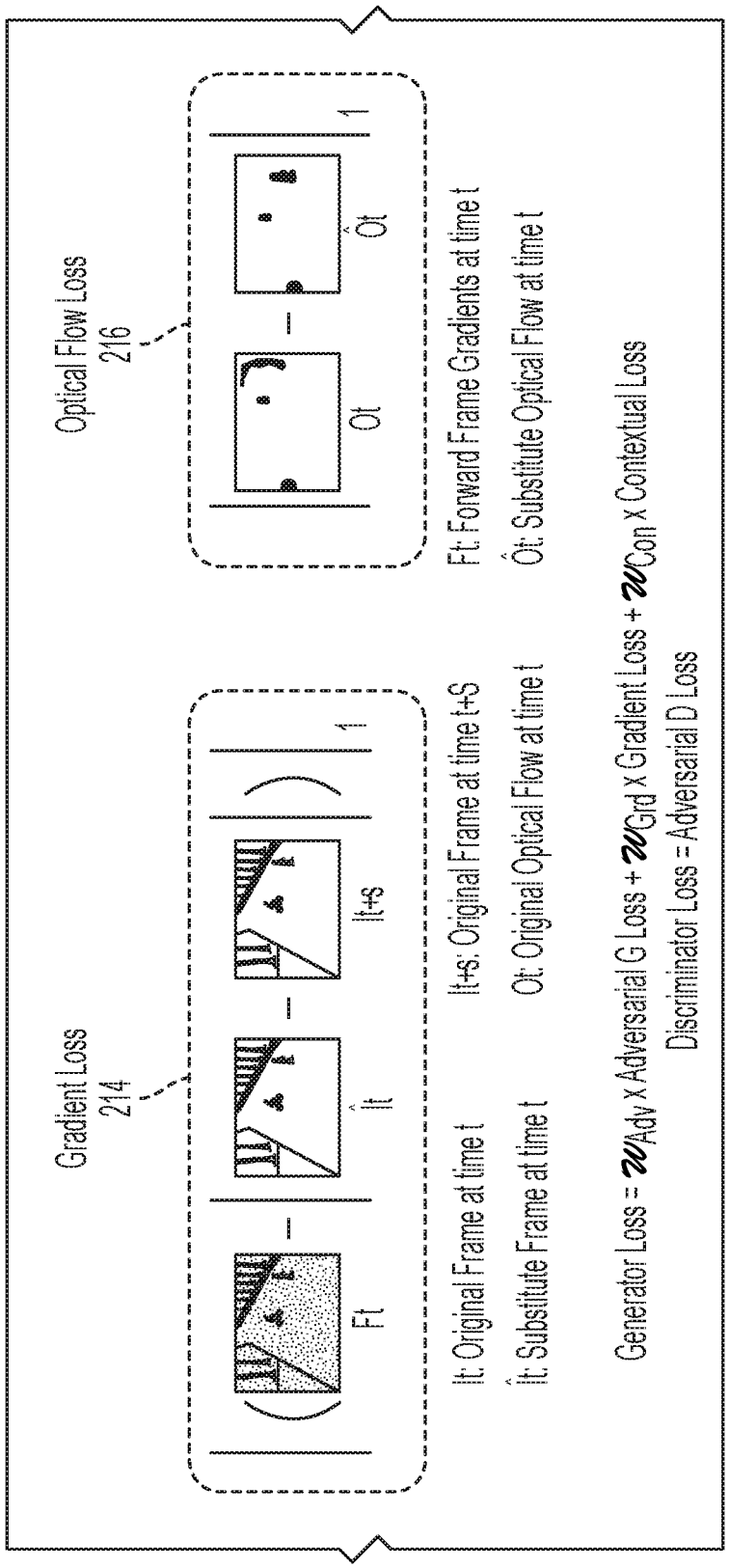
Figure 2C:
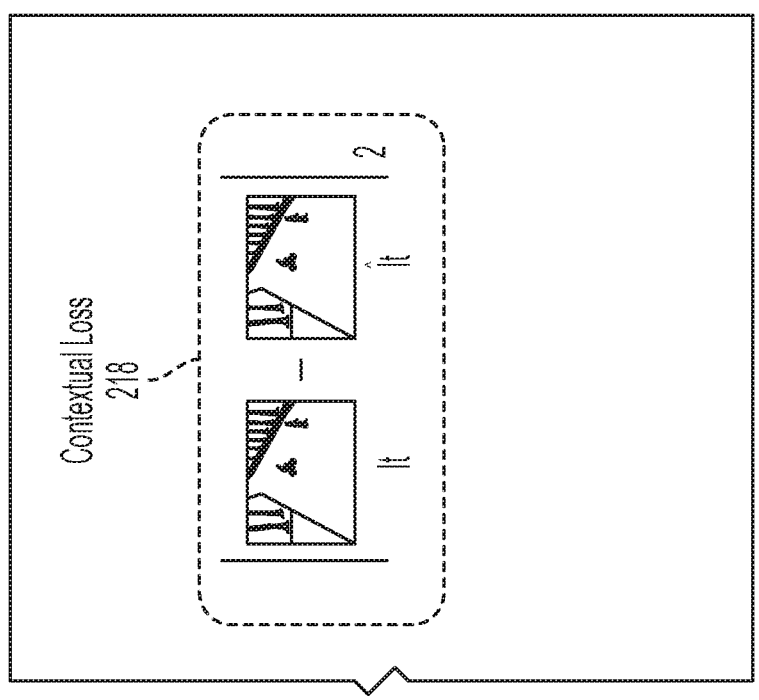

FIGS. 2A, 2B and 2C illustrate an overview of an approach in an embodiment for video anomaly detection. In an embodiment the network training allows the network to learn to suppress normal gradients disturbance by translating the gradient-embedded frames to substitute frames which are as similar to the original frames as much as possible. An anomaly score for frame-level detection can be defined based on objective functions.

Gradients Embedding

Before training, gradient-embedded frames that contain disturbance related to motion are generated. By way of example, the following operations can embed motion gradients into frames. Original training frames $Data_{trn}=\{I_1, I_2, \ldots, I_m\}$ contain m normal frames. Original testing frames $Data_{tst}=\{I_1, I_2, \ldots, I_n\}$ contain n normal and abnormal frames. Given a fixed frame interval S (m, n>S), gradient embedding may calculate the frame gradients $F_t$, for example, which is denoted as:

$$F_t = |I_t - I_{t+S}| \tag{1}$$

To obtain the gradient-embedded frames $X_t$ with disturbance, gradient embedding may add the $I_t$ with its $F_t$. Specifically, $X_t^{i,j}$, $I_t^{i,j}$, $F_t^{i,j}$ denote every pixel value in each frame (i,j∈X, |X| is the number of pixels), the value of $X_t^{i,j}$ is assigned as 255 if the RGB value is greater than 255, such that:

$$\begin{cases} X_t^{i,j} = 255, & F_t^{i,j} + I_t^{i,j} > 255 \\ X_t^{i,j} = F_t^{i,j} + I_t^{i,j}, & \text{Otherwise} \end{cases} \tag{2}$$

After gradients embedding, input data $Data_{trn} = \{X_1, X_2, \ldots, X_{m-S}\}$ and $Data_{tst} = \{X_1, X_2, \ldots, X_{n-S}\}$ can be obtained or structured, for training and testing a generative adversarial network model.

Gradient-Embedded Anti-Disturbance Generative Adversarial Networks

In an embodiment, the Gradient-Embedded Anti-Disturbance Generative Adversarial Networks (GEAD-GAN) adopts the structure of adversarial training. Such a structure performs well on data distribution learning and fit the need for suppressing disturbance in frames. FIG. 2B shows an example GEAD-GAN in an embodiment. A GEAD-GAN can be trained with video dataset including normal scenes (e.g., without objects considered as anomalous). During inference stage, the GEAD-GAN can be run with video dataset that can include both normal and abnormal scenes. In an embodiment, the generator G 208 is a convolutional neural network (CNN), for example, a fully convolutional network such as a U-Net structure, including a encoder $G_E$, a decoder $G_D$ and the skip-connection between layers. The discriminator D 210 in an embodiment is a convolution neural network (CNN) similar to discriminator of a Deep Convolutional Generative Adversarial Network (DCGAN), which for example, uses convolutional and convolutional-transpose layers in the discriminator. The generator G 208 generates substitute frames and the discriminator D 210 classifies or determines whether or not the generated substitute frame is real.

Figure 3:
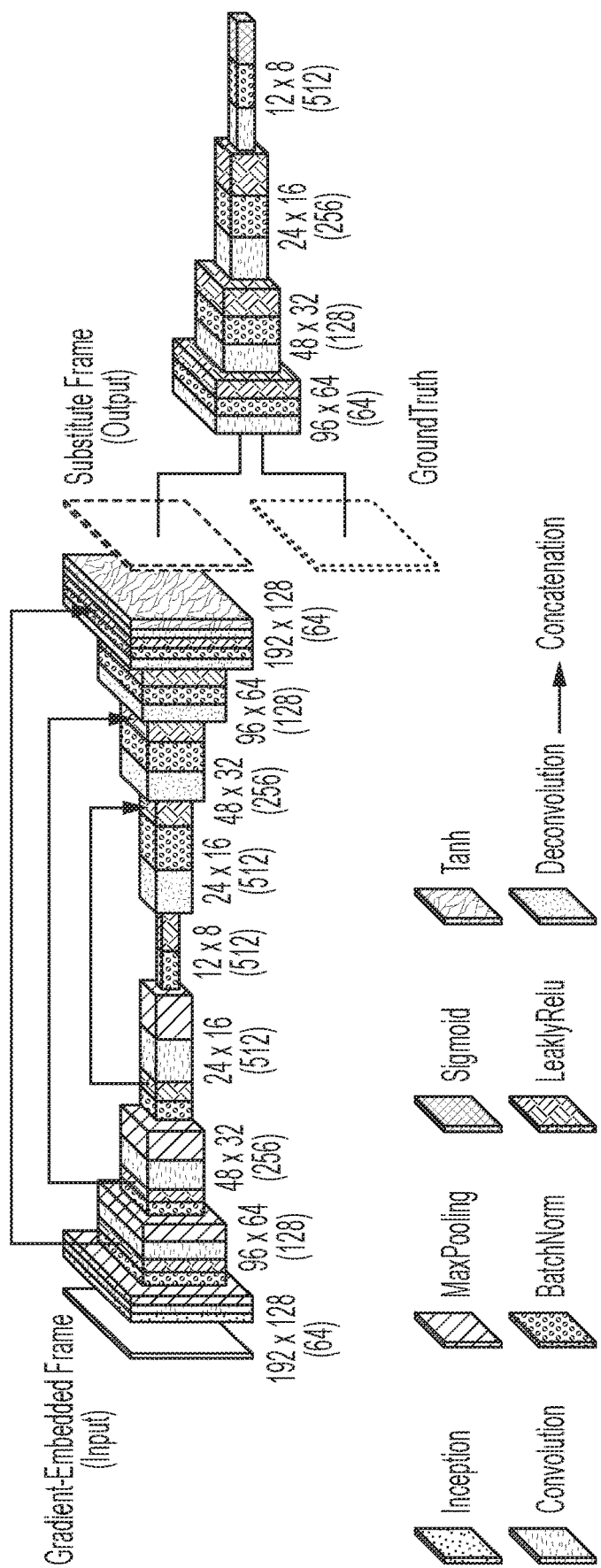
FIG. 3 illustrates an example network structure in an embodiment.

FIG. 3 illustrates an example network structure in an embodiment. A network is shown with an example number of channels in each layer. In an embodiment, the input and the output have the same size of 128×192×3. The input is a gradient-embedded frame $X_t$ and the output is the substitute frame $\hat{I}_t$.

In an embodiment, the $G_E$ adopts an inception module after input. The inception module can let a CNN decide its filter size automatically. A number of convolution operations with various filter resolutions are performed in parallel, where the features learning would be different for the same object captured at various distances, and the obtained feature maps are then concatenated along the channel axis. In one or more embodiments, because of different camera angles and object sizes in different datasets, the inception module is adopted so that the model could select its appropriate convolution operations and avoid the risk of missing high-level features.

By way of example, an Inception module can include 4 streams of convolutions of filter sizes 1×1, 3×3, 5×5 and 7×7. Each convolution layer of filter larger than 1×1 is factorized into a sequence of layers with smaller receptive fields in order to reduce the computational cost. The $G_E$ replaces Convolution layers with MaxPooling layers and the depth of networks is reduced to avoid missing features by MaxPooling operation. In an aspect, the use of skip connections can provide advantages via direct information transfer between the layers, preserving both local and global information for the still background.

In one or more embodiments, the optical flow between $I_t$, $I_{t+S}$ can be employed. The original and substitute optical flow can be calculated using a known algorithm, for example, by pre-trained FlowNet2SD. FlowNet2SD, for example, performs optical flow estimation. Another algorithm can be used. Mathematically, the definition of the elements appears in training phase as the following:

$$\hat{I}_t = G(X_t) \tag{3}$$

where $\hat{I}_t$ is the substitute frame. Then the discriminator D 210 is used to classify real frame $I_t$ from the fake one $\hat{I}_t$, such that:

$$Z_t = D(I_t) \tag{4}$$

$$\hat{Z}_t = D(\hat{I}_t) \tag{5}$$

where $Z_t$ and $\hat{Z}_t$ are the original and generated features. The FlowNet, for example, is denoted as f( ). The original optical flow $O_t$ and substitute optical flow $\hat{O}_t$ come from:

$$O_t = f(I_t, I_{t+S}) \tag{6}$$

$$\hat{O}_t = f(\hat{I}_t, I_{t+S}) \tag{7}$$

Based on above, the goal of adversarial training in one or more embodiments is to get the minimum objective function values defined as follows.

Objective Function

In one or more embodiments, the training objective function can include the generator $\mathcal{L}_G(.)$ loss and the discriminator loss $\mathcal{L}_D(.)$, containing four losses values (Contextual, Gradient, Optical Flow, and Adversarial). FIG. 2C shows training losses associated with a generative adversarial network in an embodiment. Each loss value can have its own contribution to improving the model to generate a higher quality substitute frame.

Contextual Loss

The $L_2$ distance between the original $I_t$ and the substitute $\hat{I}_t$ is calculated. For example, the $L_2$ distance or norm can be calculated as the sum of the squared vector values. In an embodiment, this may ensure that the model is capable of generating appearance frames similar to normal ones. A contextual loss 218 is defined as the following in an embodiment:

$$\mathcal{L}_{con}(I_t, \hat{I}_t) = \|I_t - \hat{I}_t\|_2 \tag{8}$$

Gradient Loss

Substitute frames can be generated to account for reasonable appearance and motion gradients distribution among frames. In one or more embodiments, the system and/or method may constrain motion with gradients, for example, in a direct form. The generated gradients are produced and the system and/or method may then calculate $L_1$ distance with real gradients in an embodiment as gradient loss 214 as follows:

$$\mathcal{L}_{grd}(I_t, \hat{I}_t, F_t) = \|F_t - |\hat{I}_t - I_{t-S}|\|_1 \tag{9}$$

For example, $L_1$ distance or norm can be calculated as the sum of the absolute values of the vector.

Optical Flow Loss

Even if a small change occurs in terms of the pixel intensity of all pixels in a generated substitute frame, it may result in a different optical flow for motion. The loss, referred to as optical flow loss 216, between a substitute optical flow and its ground truth is measured by $L_1$ distance as follows in an embodiment:

$$\mathcal{L}_{opt}(O_t, \hat{O}_t) = \|O_t - \hat{O}_t\|_1 \tag{10}$$

Adversarial Loss

An adversarial loss 212 can also be adopted. The loss 212, for example, represented in Equation (11), ensures that the generator G can generate as realistically as possible, while the loss in Equation (12) ensures the discriminator D classifies the original and the substitute (generated) frame as correctly as possible. The system and/or method may denote the original class as 1 and generated class as 0. The Binary Cross Entropy (BCE) loss function is denoted as $\mathcal{L}_{BCE}$. The adversarial loss in an embodiment is defined below:

$$\mathcal{L}_{adv}^G(\hat{Z}_t) = \mathcal{L}_{BCE}(\hat{Z}_t, 1) \tag{11}$$

$$\mathcal{L}_{adv}^D(Z_t, \hat{Z}_t) = \mathcal{L}_{BCE}(\hat{Z}_t, 0) + \mathcal{L}_{BCE}(Z_t, 1) \tag{12}$$

In an embodiment, the objective function is a weighed sum of four losses above while training G:

$$\mathcal{L}_G = \omega_{con} \mathcal{L}_{con}(I_t, \hat{I}_t) + \omega_{grd} \mathcal{L}_{grd}(I_t, \hat{I}_t, F_t) + \omega_{opt} \mathcal{L}_{opt}(O_t, \hat{O}_t) + \omega_{adv} \mathcal{L}_{adv}^G(\hat{Z}_t) \tag{13}$$

When training D, the system and/or method may fix the weights of G, using the discriminator loss:

$$\mathcal{L}_D = \mathcal{L}_{adv}^D(Z_t, \hat{Z}_t) \tag{14}$$

where $\omega_{con} = 20$, $\omega_{grd} = 0.5$, $\omega_{opt} = 0.02$ and $\omega_{adv} = 0.01$, are the weighting parameters combining individual losses in an embodiment. Other weights can be used.

Anomaly Score

In one or more embodiments, the system and/or method may provide a scoring scheme to evaluate the anomaly possibility for each frame at frame-level. In one or more embodiment, such scores are quantities measuring the similarity between ground truth and the generated output. In one or more embodiments, the Lp distance, a common score, is used. The anomaly of each frame is decided by comparing its score with a threshold. For example, the abnormal event in frames will lead to a higher score. In one or more embodiments, the anomaly score 224 for frame t is composed by appearance anomaly score $A_t^a$ 220 and motion anomaly score $A_t^m$ 222.

The $A_t^a$ measures the local appearance similarity between original $I_t$ and the substitute frame $\hat{I}_t$ for frame t. The $A_t^m$ measures the motion similarity between $I_t$ and $\hat{I}_t$ by comparing original optical flow $O_t$ and the substitute one $\hat{O}_t$. For example, $I_t$ and $\hat{I}_t$, $O_t$ and $\hat{O}_t$ are shown at 228. Mathematically, the system and/or method may define $A_t^a$ and $A_t^m$ as follows (where i and j labels all pixels in frames, P represents the frame size and |P| is its number of pixels.):

$$\begin{cases} \mathcal{A}_t^a = \frac{1}{|P|} \sum_{i,j \in P} |I_t^{i,j} - \hat{I}_t^{i,j}|^2 \\ \mathcal{A}_t^m = \frac{1}{|P|} \sum_{i,j \in P} |O_t^{i,j} - \hat{O}_t^{i,j}| \end{cases} \tag{15}$$

A normalization operation can be used for mapping scores in different orders of magnitude to a defined range. In an embodiment, the system and/or method may use a historic observation value based scheme to conduct normalization. The historic observation values during the training m frames are denoted as $w_a$ for appearance and $w_m$ for motion, which are defined as following:

$$\begin{cases} w_a = \frac{1}{m} \sum_{i=1}^m \mathcal{A}_i^a \\ w_m = \frac{1}{m} \sum_{i=1}^m \mathcal{A}_i^m \end{cases} \tag{16}$$

The variation of scenes background makes the orders of magnitude of $\mathcal{A}_t^a$, $\mathcal{A}_t^m$ different. The historic observation values are used to conduct normalization. The scores are combined via parameter k. Then, to smooth and map the score to range [0,1], the Sigmoid function Sig(•) is introduced. The anomaly score for frame $t \mathcal{A}_t$ is defined as following in an embodiment:

$$\mathcal{A}_t = Sig\left(\frac{\mathcal{A}_t^a - w_a}{w_a} + k * \frac{\mathcal{A}_t^m - w_m}{w_m}\right) \tag{17}$$

In one or more embodiments, a normalization operation can be performed on frame-level scores in each test videos (t denotes the number of frames in each test videos) as follows:

$$\hat{\mathcal{A}}_t = \frac{\mathcal{A}_t}{Max(\mathcal{A}_{1..t})} \tag{18}$$

Such normalization may achieve better performance on the whole test dataset.

Figure 4:
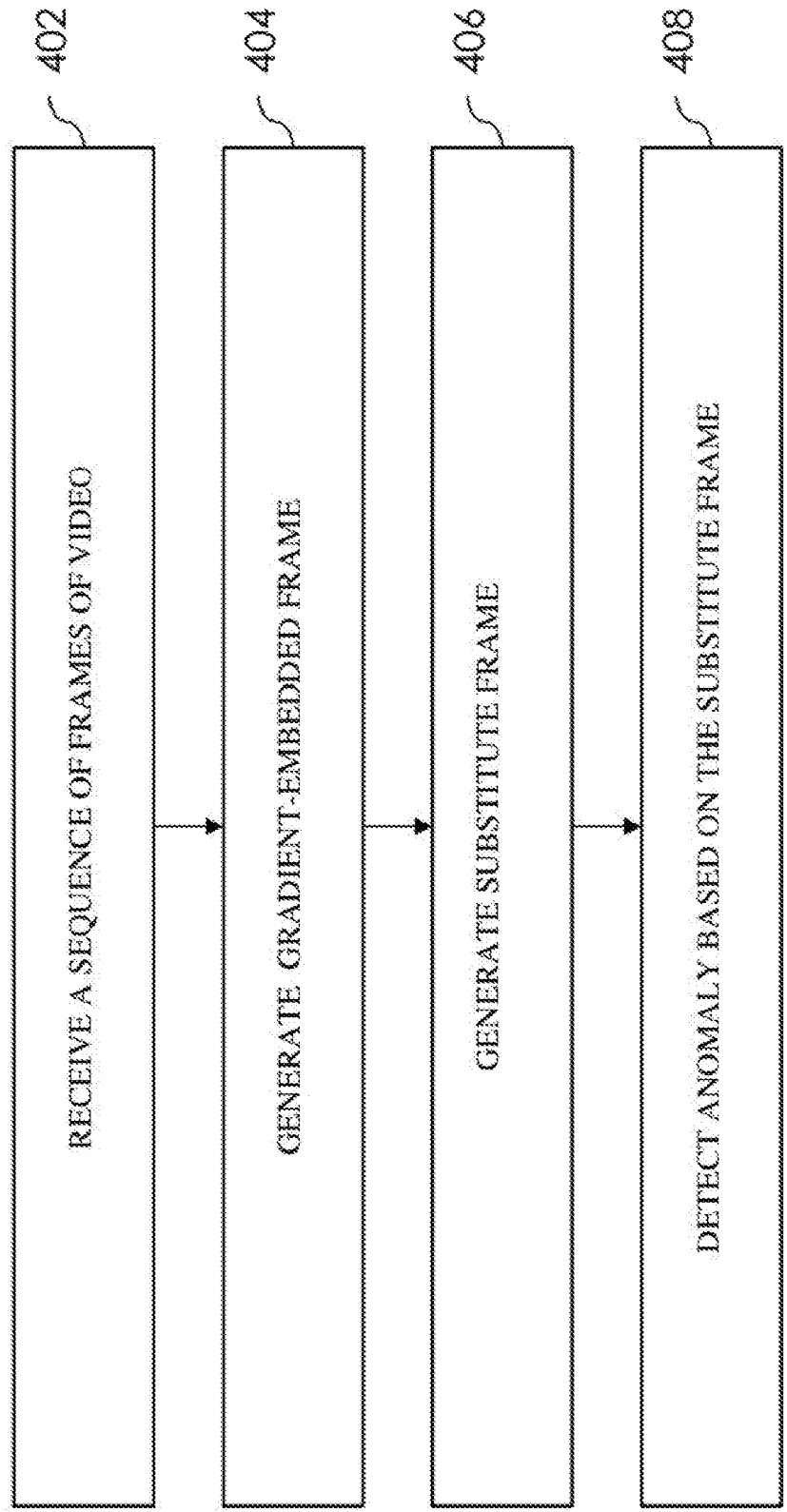
FIG. 4 is a flow diagram illustrating a method of video anomaly detection in an embodiment.

FIG. 4 is a flow diagram illustrating a method of video anomaly detection in an embodiment. The method can be run or performed by one or more processors such as one or more hardware processors. At 402, a video stream can be received. For example, a sequence of frames of a video can be received.

At 404, for a given frame in the sequence of frames, a gradient-embedded frame is generated corresponding to the given frame. The gradient-embedded frame incorporates motion information. For example, motion information can be obtained from one or more neighboring frames. In one or more embodiments, the non-local temporal information (e.g., object motion) among frames can be represented as the disturbance in frame gradients form and be embedded into local spatial information (e.g., object appearance). By way of example, a gradient-embedded frame can be generated by determining an inter-frame gradient between the given frame and a neighbor frame, the neighbor frame being a frame interval away from the given frame in the sequence of frames, and adding the inter-frame gradient to the given frame. Such adding can be conditioned on a threshold. For example, if the addition (e.g., at a pixel level) results in value greater than a threshold, the value of the given frame (e.g., at a pixel level) can be set to the threshold. The frame interval can be configurable, and for example, can be values such as 1, 3, 7, or another value.

At 406, a substitute frame is generated corresponding to the given frame by running a machine learning model such as a neural network. In an embodiment, the neural network is a trained to generate a substitute frame by learning to suppress disturbance in a training set of gradient-embedded frames. The neural network can include a generative adversarial network. The generative adversarial network can be trained based on optimizing an objective function including adversarial loss, contextual loss, gradient loss, and/or optical loss. The neural network, for example, the generative adversarial network can be trained based on a training data set, which only includes video frames without anomaly, for example, considered normal.

At 408, anomaly in the given frame can be detected by comparing the substitute frame and the given frame. For example, an anomaly score can be generated, which incorporates motion and appearance differences between the substitute frame and the given frame. In an aspect, only several video frames, e.g., several neighboring frames (e.g., not requiring an entire video) can be received for detecting anomaly in a frame.

Figure 5:
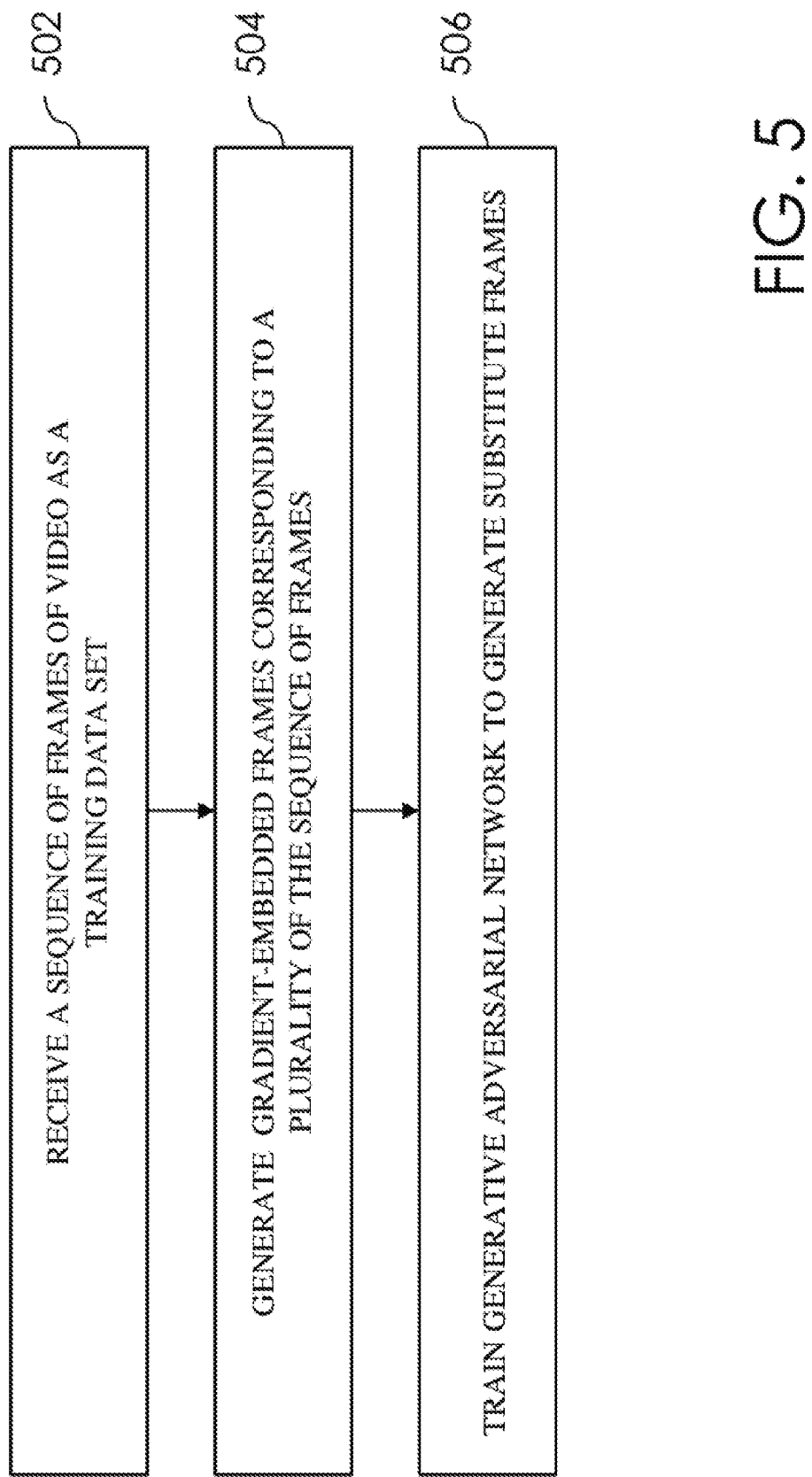
FIG. 5 is another flow diagram illustrating a method of video anomaly detection in an embodiment.
Figure 6A:
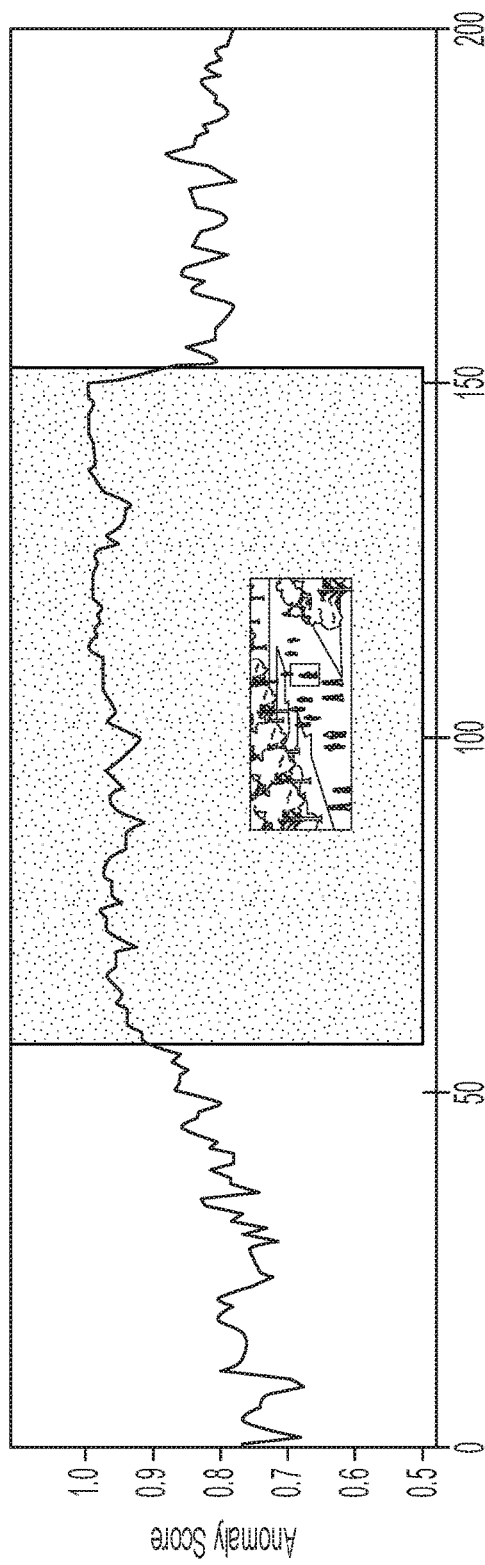
FIGS. 6A, 6B, 6C, 6D show examples of displays or presentation of graphs or maps in an embodiment.
Figure 6B:
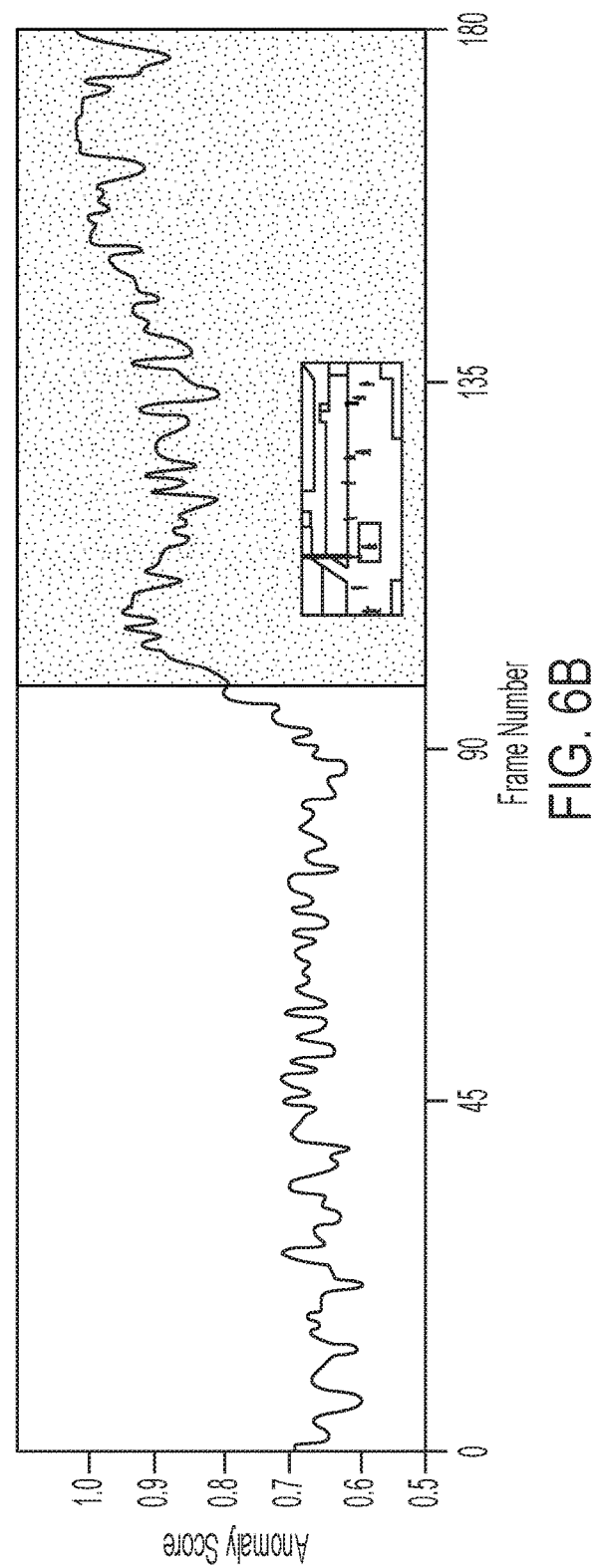
Figure 6C:
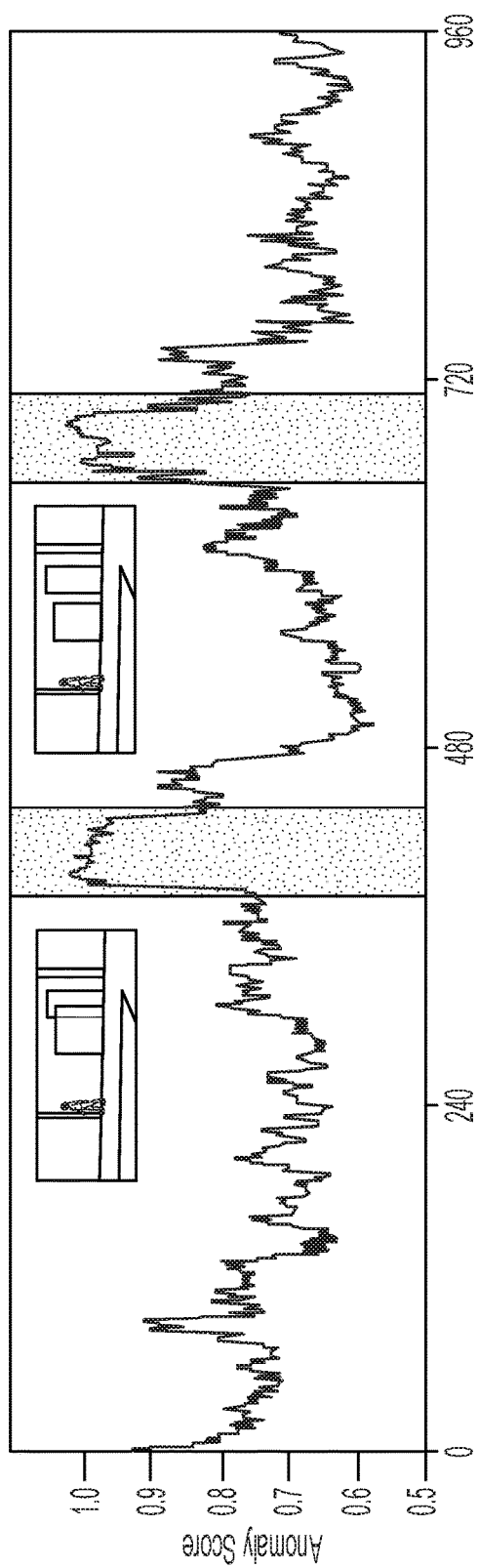
Figure 6D:
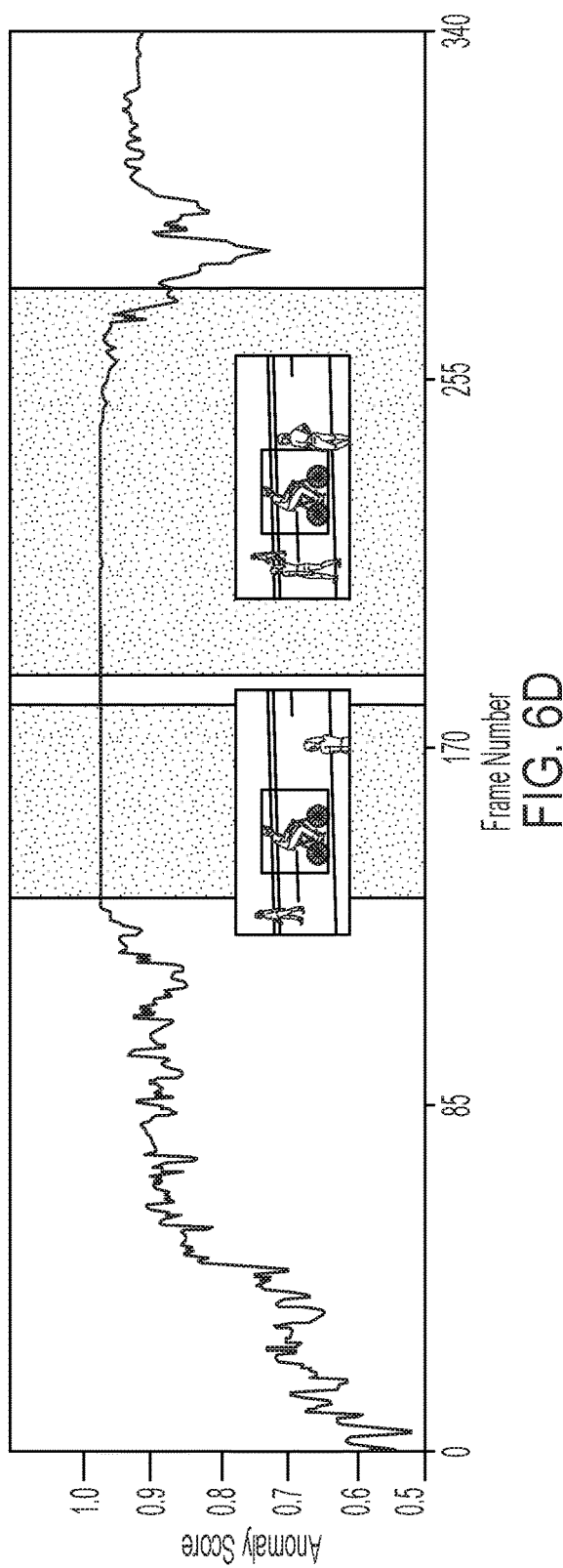

FIG. 5 is another flow diagram illustrating a method of video anomaly detection in an embodiment. One or more processors such as one or more hardware processors can run or perform the method. At 502, a video stream, for example, a sequence of frames of a video is received as a training data set.

At 504, for a given frame in the sequence of frames, a gradient-embedded frame corresponding to the given frame is generated. The gradient-embedded frame incorporates motion information. The motion information is represented as disturbance in the gradient-embedded frame. For instance, a plurality of such gradient-embedded frames are generated corresponding to a plurality of the sequence of frames. For example, motion information can be obtained from one or more neighboring frames. In one or more embodiments, the non-local temporal information (e.g., object motion) among frames can be represented as the disturbance in frame gradients form and can be embedded into local spatial information (e.g., object appearance). By way of example, a gradient-embedded frame can be generated by determining an inter-frame gradient between the given frame and a neighbor frame, the neighbor frame being a frame interval away from the given frame in the sequence of frames, and adding the inter-frame gradient to the given frame. Such adding can be conditioned on a threshold. For example, if the addition (e.g., at a pixel level) results in value greater than a threshold, the value of the given frame (e.g., at a pixel level) can be set to the threshold. The frame interval can be configurable, and for example, can be values such as 1, 3, 7, or another value.

At 506, based on the plurality of gradient-embedded frames, a machine learning model such as a neural network is trained to learn to suppress the disturbance in the gradient-embedded frame to generate a substitute frame. For instance, the neural network generates generates substitute frames under the supervision of original ones, suppressing disturbance as much as possible. In one or more embodiments, the sequence of frames of the video in the training data set includes frames without anomaly. For example, the neural network is trained using sequences of frames containing normal (e.g., no anomaly) video frames. In one or more embodiments, the neural network can be a generative adversarial network. In one or more embodiments, the generative adversarial network is trained based on optimizing an objective function including at least one of adversarial loss, contextual loss gradient loss, and optical loss.

For example, the trained neural network is run to detect anomaly in a given set of target video frames, the trained neural network receiving as input a corresponding set of target gradient-embedded frames and generating at least one substitute frame corresponding to at least one of the target gradient-embedded frames. For example, the trained neural network at the inference stage can detect an anomaly in an unknown input by failed suppression. A scoring scheme can be used for evaluating anomaly for quantitative frame-level detection. For example, the method can further include determining motion and appearance differences between a substitute frame and corresponding gradient-embedded frame to detect or evaluate anomaly.

Experimental runs of a system and/or method can be performed with sample datasets, for example, videos containing moving objects and people such as moving cars, bicycles, and people. For example, a dataset can include videos of walk zone scenes including pedestrians. Another sample dataset on which an experimental run can be performed can include campus scenes, for example, with throwing and/or dropping of objects, running, and/or other motion. Each of the datasets can be divided into training videos and testing videos.

By way of example, the training implementation details can include the following. The generator G can be optimized, for example, via Adam optimizer (a gradient based optimization), with an initial learning rate, for example, of 0.00001 with a lambda decay, and momentums $beta_1$=0.5, $beta_2$=0.999. The learning rate of discriminator D can be 0.0001 and other one or more settings can be the same as G. The mini-batch size, for example, can be set to 2. The frame gradients interval S, for example, can be set to 3. Other settings or other hyper-parameters can be used.

By way of example, in an embodiment, the system and/or method can adopt FlowNet or FlowNet2SD to calculate optical flow. The parameter k in Equation (17) can be set to 0.5 or 0.05 and may depend on the quality of optical flow. Other settings can be used. Programming languages or tools, for example, which provide tensor computation capabilities can be used to code or implement the system and/or method in one or more embodiments, and for example, run on one or more processors such as a CPU, GPU, and/or other processors.

For an evaluation metric for anomaly detection, the system and/or method may calculate the Receiver Operation Characteristic (ROC) by gradually changing the threshold of regular scores. Then the Area Under Curve (AUC) can be accumulated to a scalar for performance evaluation. A higher AUC indicates better anomaly detection performance. The system and/or method may adopt a frame-level AUC.

In one or more embodiments, the system and/or method may calculate the anomaly score based on the generation error after the model trained. In one or more embodiments, frames containing abnormal events have a higher score and the frames containing only normal events have lower score. A different scheme can be used (for example, abnormal events can have a lower score and normal events can be a higher score). In one or more embodiments, the generation error is calculated from every pixel in every frame, enabling locating of the abnormal region of the frames which differ from normal ones.

In inference stage, the original frames can contain both normal and abnormal events. GEAD-GAN model can output corresponding substitute frames. An error map can be generated, for example, calculated through subtracting original ones with their substitutes. The anomaly (e.g., which may occur in scenes of biking, jumping, chasing) can be labeled, for example, with coded boxes such as, with red boxes while some normal ones can be labeled with green boxes. Other codes or coding can be used to designate anomalous and normal data in the video. The lighter shaded region in the generation error map can represent a higher error. For example, it can be observed that the abnormal regions are lighter than normal ones, enabling locating of the anomaly in the frames at pixel-level, for example, visually.

The anomaly scores and labels on test videos can be presented, for example, as a display. For example, a graph can be mapped to include a y-axis representing anomaly score and an x-axis representing frames in the video. FIGS. 6A, 6B, 6C, 6D show examples of displays or presentation of graphs or maps in an embodiment. A line on a graph can show a frame-level anomaly score and areas on the graph can show label of the anomaly. Specific video frames can also be shown on the graph, and box(es) (or another designation) can be shown on top of the frames to depict the area(s) in the frames containing anomaly. In this example, the anomaly score of a frame sequence rises when the anomaly occurs. A correlation between the anomaly scores (lines) and the abnormal events labels (areas) can be shown. In one or more embodiments, visual displays of maps can be generated and presented. In one or more embodiments, a moving graph of such visual displays may be provided as a video stream is input and a sequence of frames in the video stream is processed for detecting anomaly in one or more of the frames in the video stream.

In one or more embodiments, for example, based on the generation error, the anomaly score is calculated by Equations (17) and (18), and can be further used to detect abnormal events. Experimental results show efficiency in video anomaly detection disclosed herein.

In one or more embodiments, the system and/or method represent object motion as the disturbance from the embedding frame gradient which helps transfer non-local temporal information to be local in a single frame and reduce the size of the input. Embedding gradients, for example, introducing and suppressing disturbance can provide effectiveness in video anomaly detection. For example, transformation on temporal information can help a neural network model learn more effective features in the video anomaly detection. In one or more embodiments, one or more losses can be used in the objective function. For example, multiple losses such as gradient loss, adversarial loss, optical flow loss and contextual loss can be used. In one or more embodiments, different frame intervals can be used, for example, intervals of 1, 3, 7, or another frame interval, for gradient embedding.

In one or more embodiments, GEAD-GAN disclosed herein can address video anomaly detection through representing motion as frame gradient disturbance in frames, then suppressing such disturbance to generate the corresponding substitute, and comparing it with the original frame. In one or more embodiments, the anti-disturbance model GEAD-GAN is designed as the form of Image-to-Image translation networks. A historic observation value based scheme of anomaly score evaluation can be used to reduce the effect of varied scenes.

Figure 7:
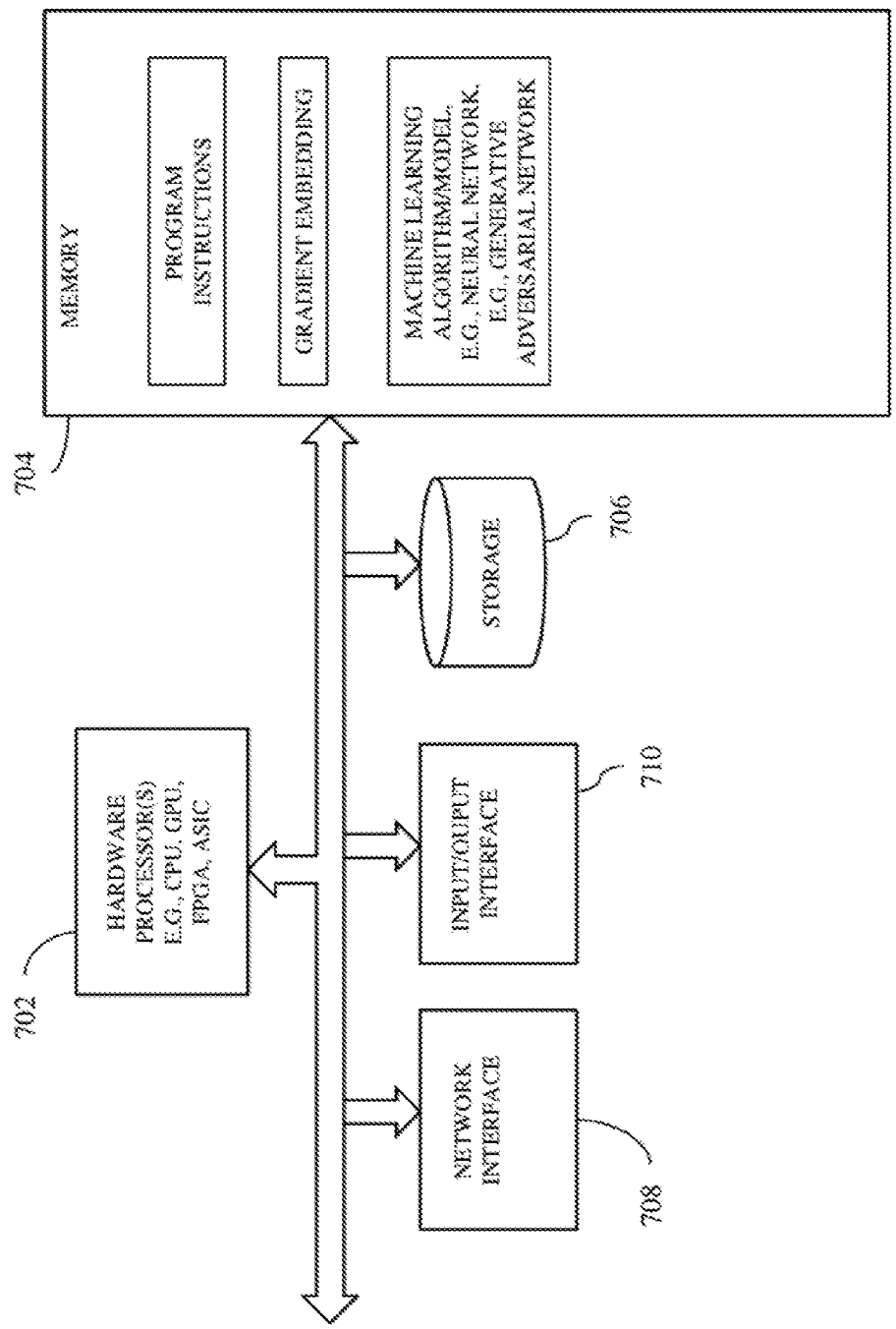
FIG. 7 is a diagram showing components of a system in an embodiment that can detect video anomaly in video frames.

FIG. 7 is a diagram showing components of a system in an embodiment that can detect video anomaly in video frames. One or more hardware processors 702 such as a central processing unit (CPU), a graphic process unit (GPU), and/or a Field Programmable Gate Array (FPGA), an application specific integrated circuit (ASIC), and/or another processor, may be coupled with a memory device 704, generate gradient-embedded frames, train a neural network to generate substitute frames based on the gradient-embedded frames, which closely match corresponding original frames. A memory device 704 may include random access memory (RAM), read-only memory (ROM) or another memory device, and may store data and/or processor instructions for implementing various functionalities associated with the methods and/or systems described herein. One or more processors 702 may execute computer instructions stored in memory 704 or received from another computer device or medium. A memory device 704 may, for example, store instructions and/or data for functioning of one or more hardware processors 702, and may include an operating system and other program of instructions and/or data. One or more hardware processors 702 may receive input, for example, including a video stream or a sequence of video frames. For instance, at least one hardware processor 702 may generate a neural network model such as a generative adversarial network to generate substitute frames. In one aspect, training dataset (e.g., a sequence of video frames) may be stored in a storage device 706 or received via a network interface 708 from a remote device, and may be temporarily loaded into a memory device 704 for building or generating the model. Similarly, a set or sequence of video frames including possible anomalous frames can be received for anomaly detection. The learned model may be stored on a memory device 704, for example, which can be run by one or more hardware processors 702. One or more hardware processors 702 may be coupled with interface devices such as a network interface 708 for communicating with remote systems, for example, via a network, and an input/output interface 710 for communicating with input and/or output devices such as a keyboard, mouse, display, and/or others.

Figure 8:
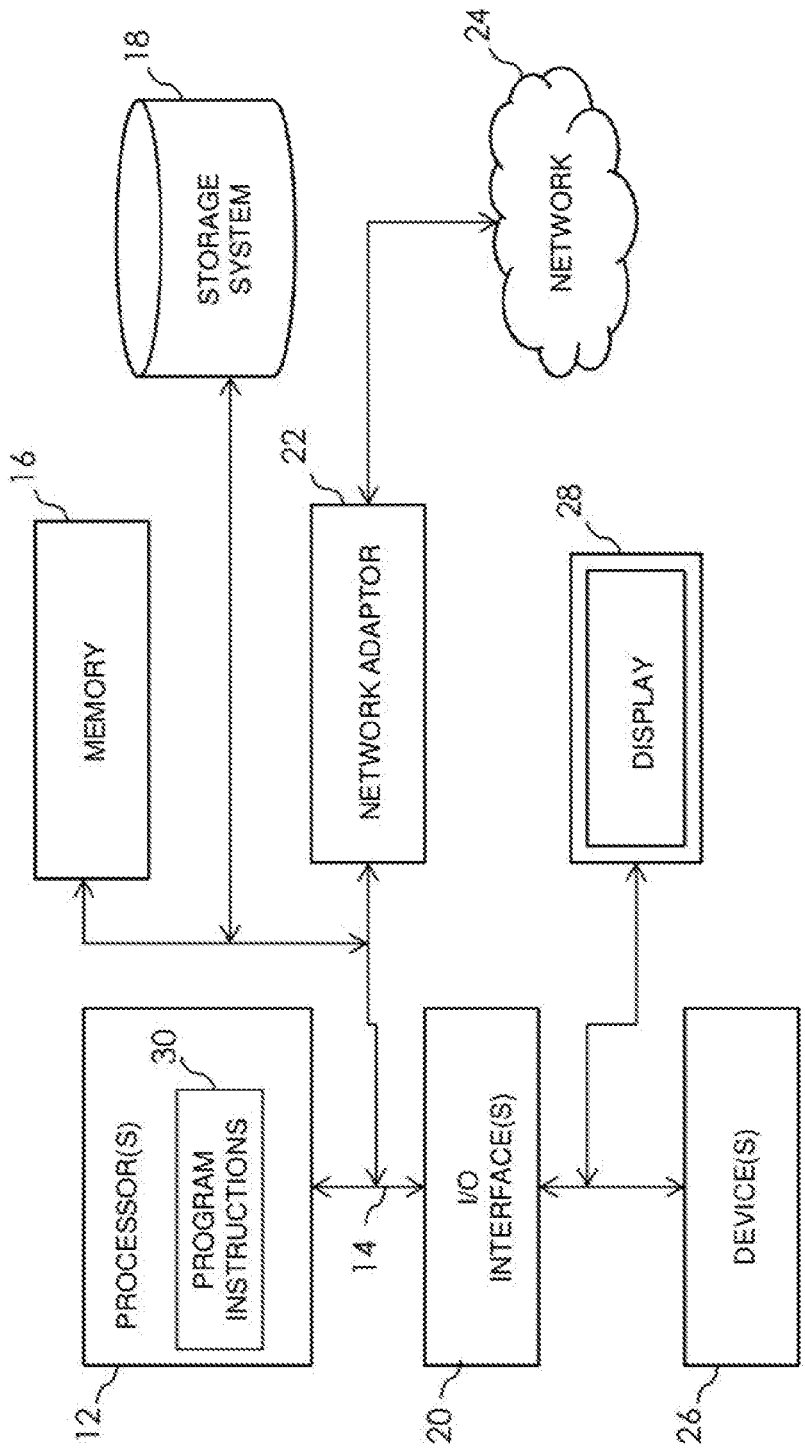
FIG. 8 illustrates a schematic of an example computer or processing system that may implement a video anomaly detection system in an embodiment.

FIG. 8 illustrates a schematic of an example computer or processing system that may implement a video anomaly detection system in an embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction run device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   receiving a sequence of frames of a video;
   for a given frame in the sequence of frames, generating a gradient-embedded frame corresponding to the given frame, the gradient-embedded frame incorporating motion information;
   generating a substitute frame corresponding to the given frame by running a neural network, the neural network trained to generate a substitute frame by learning to suppress disturbance in a training set of gradient-embedded frames; and
   comparing the substitute frame and the given frame to detect anomaly in the given frame.

2. The method of claim 1, wherein the neural network includes a generative adversarial network.

3. The method of claim 2, wherein the generative adversarial network is trained based on optimizing an objective function including adversarial loss.

4. The method of claim 2, wherein the generative adversarial network is trained based on optimizing an objective function including contextual loss.

5. The method of claim 2, wherein the generative adversarial network is trained based on optimizing an objective function including gradient loss.

6. The method of claim 2, wherein the generative adversarial network is trained based on optimizing an objective function including optical loss.

7. The method of claim 1, wherein the comparing includes generating an anomaly score incorporating motion and appearance differences between the substitute frame and the given frame.

8. The method of claim 1, wherein the neural network is trained based on a training data set including video frames without anomaly.

9. The method of claim 1, wherein the generating a gradient-embedded frame includes determining an inter-frame gradient between the given frame and a neighbor frame, the neighbor frame being a frame interval away from the given frame in the sequence of frames, and adding the inter-frame gradient to the given frame conditioned on a threshold.

10. The method of claim 9, wherein the frame interval is configurable.

11. A computer-implemented method comprising:
    receiving a sequence of frames of a video as a training data set;
    for a given frame in the sequence of frames, generating a gradient-embedded frame corresponding to the given frame, the gradient-embedded frame incorporating motion information, the motion information represented as disturbance in the gradient-embedded frame, wherein a plurality of gradient-embedded frames are generated corresponding to a plurality of the sequence of frames; and based on the plurality of gradient-embedded frames, training a neural network to learn to suppress the disturbance in the gradient-embedded frame to generate a substitute frame.

12. The method of claim 11, wherein the sequence of frames of the video in the training data set includes frames without anomaly.

13. The method of claim 11, wherein the neural network includes a generative adversarial network.

14. The method of claim 13, wherein the generative adversarial network is trained based on optimizing an objective function including at least one of adversarial loss, contextual loss gradient loss, and optical loss.

15. The method of claim 11, wherein the trained neural network is run to detect anomaly in a given set of target video frames, the trained neural network receiving as input a corresponding set of target gradient-embedded frames and generating at least one substitute frame corresponding to at least one of the target gradient-embedded frames.

16. The method of claim 15, further including determining motion and appearance differences between the at least one substitute frame and the at least one of the target gradient-embedded frames to detect anomaly.

17. The method of claim 11, wherein the generating a gradient-embedded frame includes determining an inter-frame gradient between the given frame and a neighbor frame, the neighbor frame being a frame interval away from the given frame in the sequence of frames, and adding the inter-frame gradient to the given frame conditioned on a threshold.

18. A system comprising:
a processor; and
a memory device coupled with the processor;
the processor configured to:
receive a sequence of frames of a video as a training data set;
for a given frame in the sequence of frames, generate a gradient-embedded frame corresponding to the given frame, the gradient-embedded frame incorporating motion information among a set of neighboring frames of the given frame, the motion information represented as disturbance in the gradient-embedded frame, wherein a plurality of gradient-embedded frames are generated corresponding to a plurality of the sequence of frames; and
based on the plurality of gradient-embedded frames, train a generative adversarial network to learn to suppress the disturbance in the gradient-embedded frame to generate a substitute frame.

19. The system of claim 18, wherein to generate the gradient-embedded frame, the processor is configured to determine an inter-frame gradient between the given frame and a neighbor frame, the neighbor frame being a frame interval away from the given frame in the sequence of frames, and to add the inter-frame gradient to the given frame conditioned on a threshold.

20. The system of claim 18, wherein the generative adversarial network is trained using sequence of frames of the video having no anomaly and used to detect anomaly on video data having anomaly.

* * * * *